(12) United States Patent
Bocanegra et al.

(10) Patent No.: US 6,671,441 B1
(45) Date of Patent: Dec. 30, 2003

(54) OPTICAL CABLING APPARATUS HAVING IMPROVED DRY FILLING COMPOUND AND METHOD FOR MAKING

(75) Inventors: Luis M Bocanegra, Alpharetta, GA (US); Christopher Shawn Davis, Lilburn, GA (US); Harold P Debban, Jr., Snellville, GA (US); Clyde Jefferson Lever, Jr., Buford, GA (US); Peter A Weimann, Atlanta, GA (US)

(73) Assignee: Fitel USA Corp., Norcross, GA (US)

( * ) Notice: Subject to any disclaimer, the term of this patent is extended or adjusted under 35 U.S.C. 154(b) by 64 days.

(21) Appl. No.: 09/660,425

(22) Filed: Aug. 22, 2000

(51) Int. Cl.[7] .................................................. G02B 6/44
(52) U.S. Cl. ...................................................... 385/112
(58) Field of Search ................................ 385/112, 109, 385/103, 106, 114, 100, 113, 111; 250/227, 231 R

(56) References Cited

U.S. PATENT DOCUMENTS

| | | | | |
|---|---|---|---|---|
| 4,866,265 A | * | 9/1989 | Hohne | 250/227 |
| 5,684,904 A | * | 11/1997 | Bringuier et al. | 385/109 |
| 5,698,615 A | * | 12/1997 | Polle | 385/109 |
| 5,740,295 A | * | 4/1998 | Kinard et al. | 385/109 |
| 6,304,701 B1 | * | 10/2001 | Bringuier et al. | 385/106 |

* cited by examiner

Primary Examiner—Jean F. Duverne
(74) Attorney, Agent, or Firm—John M. Harman

(57) ABSTRACT

Embodiments of the invention include an optical communication system having an optical cable with an improved configuration for multi-fiber arrangements. In particular, the invention is embodied in an optical communication system including an optical cable having an improved dry filling compound for protecting and maintaining multi-fiber arrangements therein and yet enabling relatively easy access thereto. The system includes a source of optical energy, an optical cable coupled to the source for transmitting optical energy from the source, and a receiver coupled to the optical cable for receiving optical energy from the source. The optical cable includes at least one multi-fiber unit tube having therein a plurality of optical fibers such as individual fibers or one or more fiber ribbons, and a dry filling compound formed around the at least one multi-fiber unit tube. The dry filling compound is made of a soft, non-adhesive plastic or rubber material and formed around the multi-fiber unit tubes in such a way that the relative position of the multi-fiber unit tubes are maintained with respect to one another within the optical cable. The dry filling compound is made of a material such as an extrudable rubber or plastic, a soft UV-curable acrylate, a plasticized polyvinylchloride, a soft polyolefin, a butyl rubber, an ethylene-propylene rubber, a polyurethane foam or other suitable reactively-formed foams. The dry filling compound material is firm enough to maintain the relative positions of the multi-fiber unit tubes within the optical cable but soft enough to allow relatively easy access into the optical cable.

23 Claims, 4 Drawing Sheets

OPTICAL CABLING APPARATUS HAVING IMPROVED DRY FILLING COMPOUND AND METHOD FOR MAKING

BACKGROUND OF THE INVENTION

1. Field of the Invention

The invention relates to optical cabling. More particularly, the invention relates to multi-fiber unit optical cabling having improved dry filling compounds.

2. Description of the Related Art

The explosive growth in demand for information-transmitting capacity in communications networks including data networks has spawned an increase in the number of optical fibers housed within optical fiber cables. Also, the increasing use of optical fibers for shorter-haul distances has further prompted a need for optical cables with larger fiber counts. Such short-haul uses include local loop applications and delivery of communication services to homes and offices. Because of these increased demands placed on optical fiber communication systems, the organization and alignment of optical fibers, e.g., for interconnection between various optical devices, has become more important to the overall performance of the optical system.

Typically, optical fiber cables include a plurality of multi-fiber units such as multi-fiber tubes. The multi-fiber tubes contain a plurality of individual optical fibers or, alternatively, a plurality of optical fiber ribbons. Conventionally, optical cabling for multi-fiber units such as multi-fiber unit tubes includes arrangements that house the multi-fiber units in a loose arrangement. See, e.g., U.S. Pat. No. 4,909,593. However, such loose arrangements have lower fiber packing densities than many conventional central core optical cables with similar fiber counts. Also, loose arrangements often must use wet filling compounds such as petroleum-based gels to reduce unnecessary shifting and/or crushing of the multi-fiber units and the individual optical fibers within the multi-fiber units. Such shifting and crushing often damages the optical fibers, e.g., by causing the individual optical fibers break or chip, thus reducing optical performance. However, many filling compounds are relatively expensive and typically are difficult to clean off or remove, thus increasing the difficulty of accessing the optical fibers within an optical cable, especially for mid-span accessing of the optical cable.

Moreover, such loose arrangements with or without conventional wet filling compounds typically do not maintain the relative position of the multi-fiber units within the cabling. Maintaining such positioning often is necessary, e.g., to preserve stranding of multi-fiber units that enhances optical performance. For example, many multi-fiber tubes include stranding patterns such as S-Z stranding to improve the bending characteristics of the optical cable by reducing strain on the optical fibers without impairing their optical performance. However, many conventional arrangements that do tend to maintain cable stranding include jackets or other suitable housing that are relatively rigid and thus pose problems accessing the optical fibers within the optical cable.

Accordingly, it would be desirable to have available optical cables that protectively encase multi-fiber units and/or fiber ribbons without the need for filling gels or other compounds. Also, the desirable optical cable should provide relatively easy access to the contents therein, but still be rigid enough to maintain any stranding arrangements of the optical fibers therein.

SUMMARY OF THE INVENTION

Embodiments of the invention include an optical communication system including an optical cable having an improved dry filling compound for protecting and maintaining multi-fiber arrangements therein and yet enabling relatively easy access thereto. The system includes a source of optical energy, an optical cable coupled to the source for transmitting optical energy from the source, and a receiver coupled to the optical cable for receiving optical energy from the source. The optical cable includes at least one multi-fiber unit tube having therein a plurality of optical fibers such as individual fibers or one or more fiber ribbons, and a dry filling compound formed around the at least one multi-fiber unit tube. The dry filling compound is made of a soft, non-adhesive plastic or rubber material and formed around the multi-fiber unit tubes in such a way that the relative position of the multi-fiber unit tubes are maintained with respect to one another within the optical cable. The dry filling compound is made of a material such as an extrudable rubber or plastic, a soft UV-curable acrylate, a soft polyolefin, a butyl rubber, or an ethylene-propylene rubber. Alternatively, the dry filling compound made from any of these materials is foamed, e.g., by chemical blowing during extrusion, gas injection during extrusion, or reactive foaming. The dry filling compound material is firm enough to maintain the relative positions of the multi-fiber unit tubes within the optical cable but soft enough to allow relatively easy access into the optical cable.

DETAILED DESCRIPTION

Figure 1:
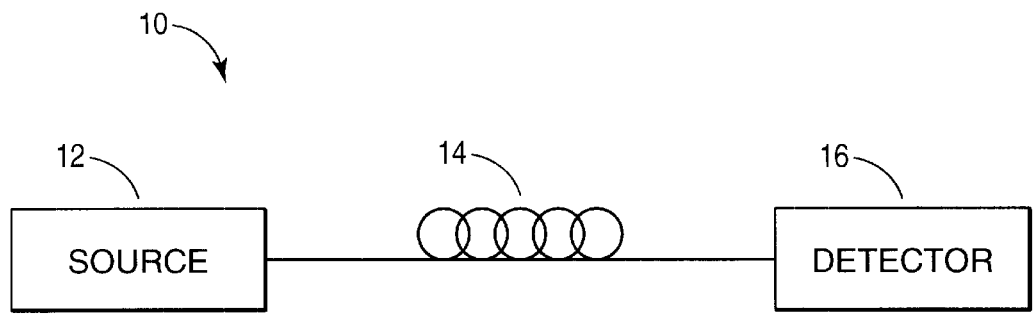
FIG. 1 is a simplified block diagram of an optical waveguide system in which embodiments of the invention are useful.

In the following description similar components are referred to by the same reference numeral in order to enhance the understanding of the invention through the description of the drawings. Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, a simplified block diagram of an optical communications system 10 according to embodiments of the invention is shown. The optical communications system 10 includes one or more optical sources 12 coupled, e.g., in a conventional manner, to one or more optical fiber cables 14 having a plurality of optical fibers arranged within one or more multi-fiber units such as multi-fiber tubes or, alternatively, one or more optical fiber ribbons. The optical fiber cables 14 are coupled to one or more optical detectors or receivers 16, e.g., in a conventional manner.

The optical fiber cables 14 are configured in accordance with embodiments of the invention, e.g., as will be discussed hereinbelow. That is, the optical fiber cables 14 include a soft, non-adhesive plastic rubber, or polymeric dry filling compound that is extruded, foamed, cured, encased or otherwise formed around the one or more multi-fiber units in such a way that the multi-fiber units generally are not free to move around within the optical fiber cable.

Figure 2:
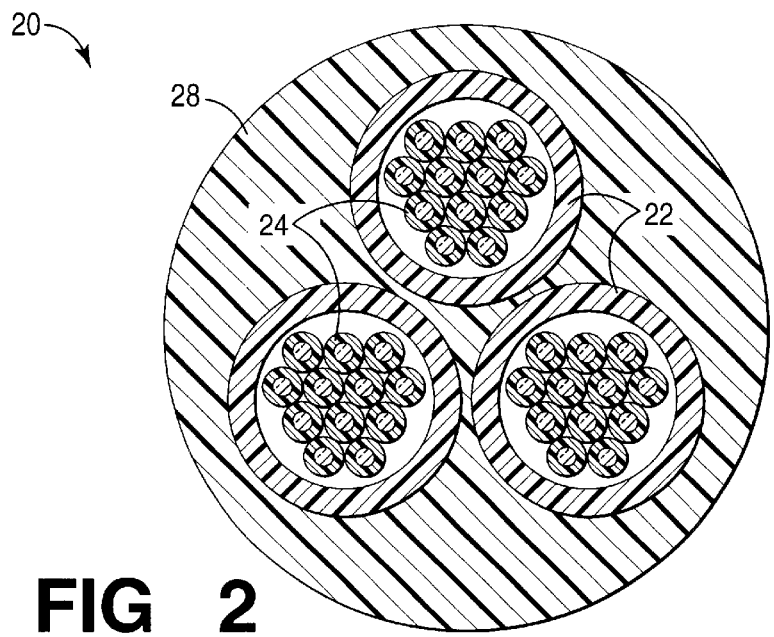
FIG. 2 is a cross-sectional view of a multi-fiber optical cable according to an embodiment of the invention.
Figure 3:
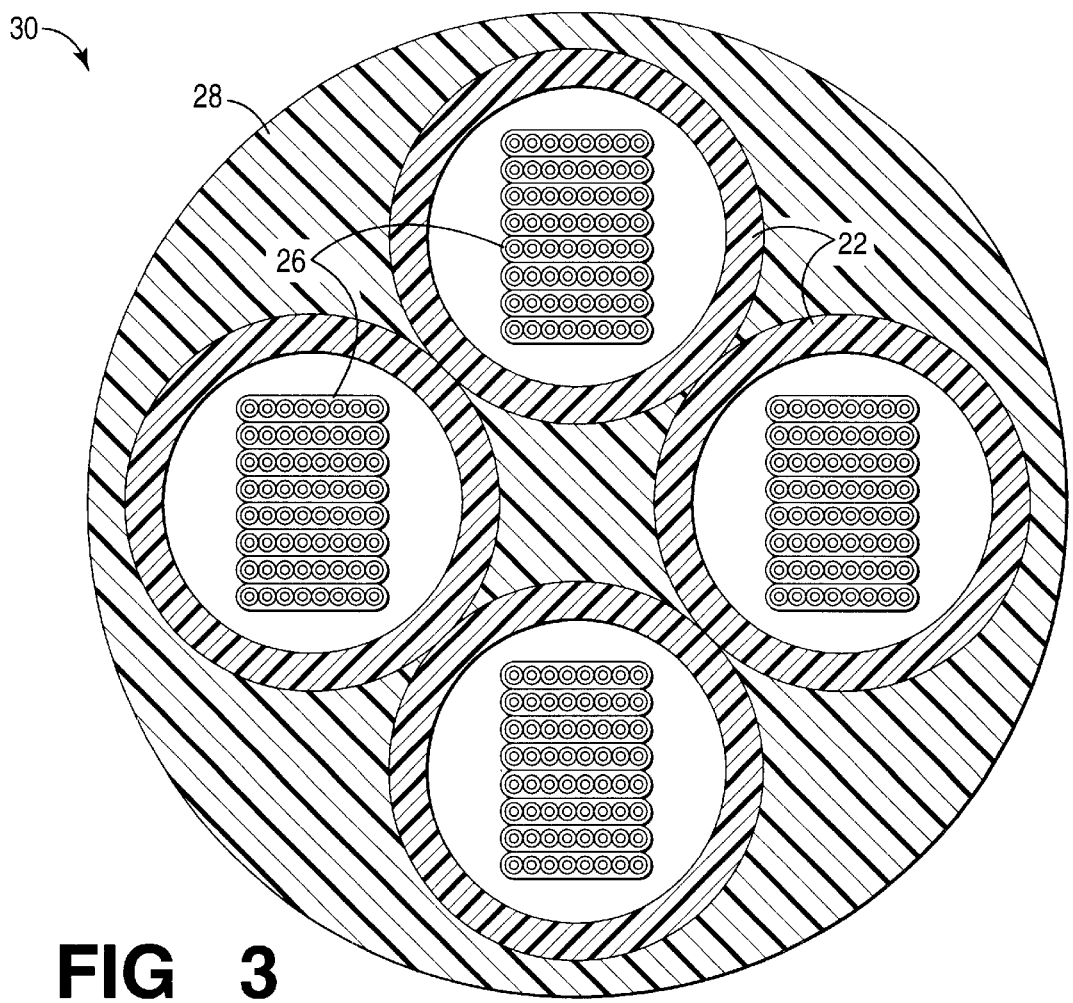
FIG. 3 is a cross-sectional view of a multi-fiber optical cable according to another embodiment of the invention.

Referring now to FIGS. 2–3, shown are cross-sectional views of a multi-fiber optical cable 20 according to embodiments of the invention that is suitable for use in optical waveguide systems, e.g., the optical waveguide system 10 shown in FIG. 1. The multi-fiber optical cable 20 includes a plurality of optical fibers surrounded by or otherwise encased in one or more multi-fiber unit tubes 22. As will be discussed in greater detail hereinbelow, water blocking agents such as water blocking yarns, water blocking tapes and/or water blocking powders often are provided between multi-fiber unit tubes 22.

The plurality of optical fibers are disposed within the respective multi-fiber unit tubes 22 as a plurality or individual fibers 24, e.g., as shown in FIG. 2, or, alternatively, as one or more fiber ribbons 26, e.g., as shown in the alternative arrangement of FIG. 3. Fiber ribbons typically include a plurality of optical fibers that extend longitudinally and are laterally adjacent and bound together laterally by a matrix material as a single, linear array of optical fibers.

In the embodiment shown in FIG. 2, the multi-fiber unit tubes 22 fit loosely over the individual optical fibers 24, e.g., as discussed hereinabove in connection with U.S. Pat. No. 4,909,593. Often, a gel or other suitable wet filling compound is disposed within the multi-fiber unit tubes 22 with the individual optical fibers 24. Alternatively, superabsorbent powder or fibers are disposed within the multi-fiber unit tubes 22 with the individual optical fibers 24 to block water penetration within the multi-fiber unit tubes 22. The multi-fiber unit tubes 22 are made of a suitable thermoplastic or elastomeric material such as polyethylene, polypropylene, polyester-based thermoplastic elastomers, polyether-based thermoplastic elastomers, soft ethylene-propylene copolymers, plasticized polyvinylchloride, styrene-butadiene rubber, or other extrudable thermoplastic elastomers.

In the embodiment shown in FIG. 3, the multi-fiber unit tubes 22 fit relatively loosely over one or more fiber ribbons or fiber ribbon stacks 26, e.g., as discussed in co-pending application Ser. No. 09/397,444, filed Sep. 15, 1999 and assigned to the assignee of the present invention. A gel or other suitable filler material often occupies at least a portion of the region between the fiber ribbons 26 and the multi-fiber unit tubes 22. Alternatively, the fiber ribbons 26 are enclosed by a buffer encasement to reduce or eliminate the need for filling compounds.

According to embodiments of the invention, the multi-fiber unit tubes 22 are positioned relatively firmly within the cable 20 by a dry filling compound or binding compound 28 formed around the multi-fiber unit tubes 22. That is, the dry filling/binding compound 28 maintains the relative position of the multi-fiber unit tubes 22 with respect to one another in the cable 20.

The dry filling compound 28 is made of any suitably soft plastic or rubber material that typically does not adhere to the multi-fiber unit tubes 22. Suitable dry filling compound materials include, e.g., an extrudable rubber or plastic, such as plasticized polyvinylchloride (PVC), a soft UV-curable acrylate, a soft polyolefin, a butyl rubber, an ethylene-propylene rubber, a reactively-formed polyurethane foam, other reactively-formed foams, or other suitably soft material.

Alternatively, the dry filling compound 28 is filled with flame retardant fillers or other suitable fillers, e.g., calcium carbonate and other carbonates, alumina, talc, silica, kaolinite and other clays, magnesium hydroxide, aluminum trihydrate, and glass. According to one embodiment of the invention, the dry filling compound 28 includes a butyl rubber or an ethylene-propylene rubber highly filled (e.g., approximately 80%) with one or more of these fillers. One such suitable dry filling compound material includes, e.g., FM 311/1 bedding compound, manufactured by Melos Carl Bösch GmBH, a division of M. A. Hanna.

According to embodiments of the invention, the dry filling compound 28 is formed around the multi-fiber unit tubes 22, e.g., by extrusion, UV-curing, or other suitable technique, depending on the particular composition of the dry filling compound 28. For example, alternatively, the dry filling compound made from any of the materials previously discussed herein is foamed, e.g., by chemical blowing during extrusion, gas injection during extrusion, or reactive foaming. Foaming typically increases the softness of the material and reduces the overall materials cost and cable weight.

Although the multi-fiber optical cables 20 are shown with three multi-fiber unit tubes (FIG. 2) and four multi-fiber unit tubes (FIG. 3), it should be understood that other embodiments of the invention include any suitable number of multi-fiber units or multi-fiber unit tubes within the optical fiber cable 20. For example, in one embodiment, the optical fiber cable 20 includes a single multi-fiber unit tube 22, resulting in a 12-fiber cable. Alternatively, in another embodiment, the optical fiber cable 20 includes twelve multi-fiber unit tubes 22, resulting in a 144-fiber cable. However, it is possible for optical fiber cables according to embodiments of the invention to include optical fibers having a smaller or greater number of optical fibers therein.

Many conventional dry filling or bedding compounds, which include both flame-retardant and non-flame-retardant grades, are used in copper power cables or control cables, e.g., to prevent water penetration, to allow relatively easy access to the conductors, and to provide mechanical protection to wire insulation during installation. Although embodiments of the invention may benefit from a few of these characteristics indirectly, embodiments of the invention form the dry filling compound around multi-fiber units such as multi-fiber tubes and fiber ribbon stacks, e.g., to preserve the relative position of the multi-fiber units while also allowing for relatively easy access to the multi-fiber units through the dry filling compound. The dry filling compound also preserves any stranding or other twists that the optical fibers may have. Also, the inventive dry filling compound enhances crush protection compared to conventional arrangements, functions as a heat barrier and conveniently rounds out the shape of a plurality of multi-fiber units.

Also, since many dry filling compound materials according to embodiments of the invention also are flame-retardant, such as the Melos 311/1, the addition of a relatively thin, flame-retardant sheath around the dry filling compound often is sufficient to produce some indoor/outdoor optical cables. That is, often no other flame retardant layers are necessary. Such cables are relatively inexpensive, easy to handle, install and access, and have smaller cross-sectional areas than similar count optical fiber cables. Thus, the overall cable size is reduced.

Figure 4:
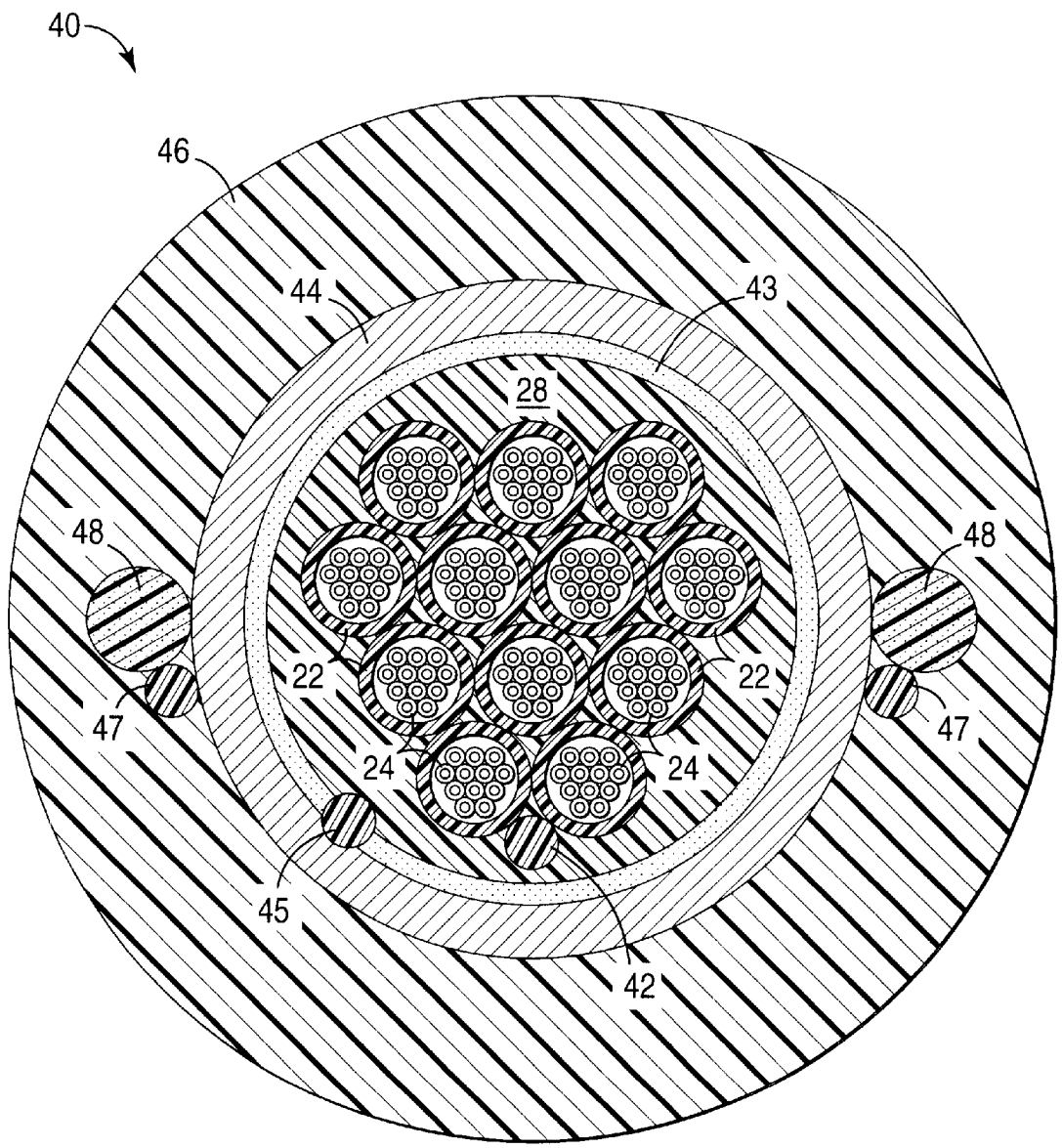
FIG. 4 is a cross-sectional view of a multi-fiber optical cable according to yet another embodiment of the invention.

Referring now to FIG. 4, shown is a cross-sectional view of a multi-fiber optical cable 40 according to an alternative embodiment of the invention. Similar to the multi-fiber optical cable 20 shown in FIG. 2 and discussed hereinabove, the cable 40 in FIG. 4 includes one or more multi-fiber unit tubes 22 having a plurality of individual optical fibers 24 therein, and a dry filling compound 28 according to embodiments of the invention formed around the multi-fiber unit tubes 22. As discussed previously herein, water blocking agents such as yarns, tapes and/or powders often are disposed generally between the multi-fiber unit tubes 22. According to alternative embodiments of the invention, the cable 40 includes one or more of the following: a first rip cord 42 formed in the dry filling compound 28, a superabsorbent powder or other water blocking layer 43 formed around the dry filling compound 28, an inner protective jacket 44 formed around the dry filling compound 28, a second rip cord 45 between the dry filling compound 28 and the inner protective jacket 44, an outer protective jacket 46, a third rip cord 47 formed in the outer protective jacket 46, and one or more strength members 48 formed in the outer protective jacket 46.

The first rip cord 42 provides easier access to the multi-fiber unit tubes 22. Although the dry filling compound 28 typically is made soft enough for an individual to access the multi-fiber unit tubes 22, e.g., by peeling off portions of the dry filling compound, the inclusion of the first rip cord 42 in the dry filling compound 28 makes access to the multi-fiber unit tubes 22 even easier.

The superabsorbent powder or other water blocking layer 43 formed around the dry filling compound 28 improves the water blocking in the cable 40. Also, the inner protective layer 44 formed around the dry filling compound 28 provides protection, e.g., from gnawing rodents. The inner protective layer 44 is made of, e.g., a layer of low release electrolytically chrome-coated steel armor, which provides both protection and easy access to the dry filling compound 28 around which it is formed.

A second rip cord 45, e.g., a 3-ply aramid rip cord, is useful to include in the inner protective layer 44 for even easier access therein. The rip cord 45 is formed, e.g., within the inner protective layer 44 or, alternatively, between the dry filling compound 28 and the inner protective layer 44.

The outer protective jacket 46 is formed, e.g., around the dry filling compound 28 and/or the inner protective layer 44. The outer protective jacket 46 is made of, e.g., a high-density polyethylene jacket or one or more other suitable materials, including medium-density polyethylene, linear low-density polyethylene, polyvinylchloride, impact-modified polypropylene, or a low-smoke zero-halogen filled polyolefin. Alternatively, the outer protective jacket 46 includes the third rip cord 47 formed therein or at the interface between the outer protective jacket 46 and, e.g., the inner protective layer 44. The third rip cord 47, which is made of, e.g., polyester or other suitable material, provides easier access to the contents of the cable 40 through the outer protective jacket 46. Also, alternatively, the one or more strength members 48 are formed in the outer protective jacket 46. The strength members 48 are made of, e.g., steel, a glass-epoxy composite, an aramid-epoxy composite, a hybrid glass-aramid-epoxy composite, glass yarn, aramid yarn, or other suitable material.

Figure 5:
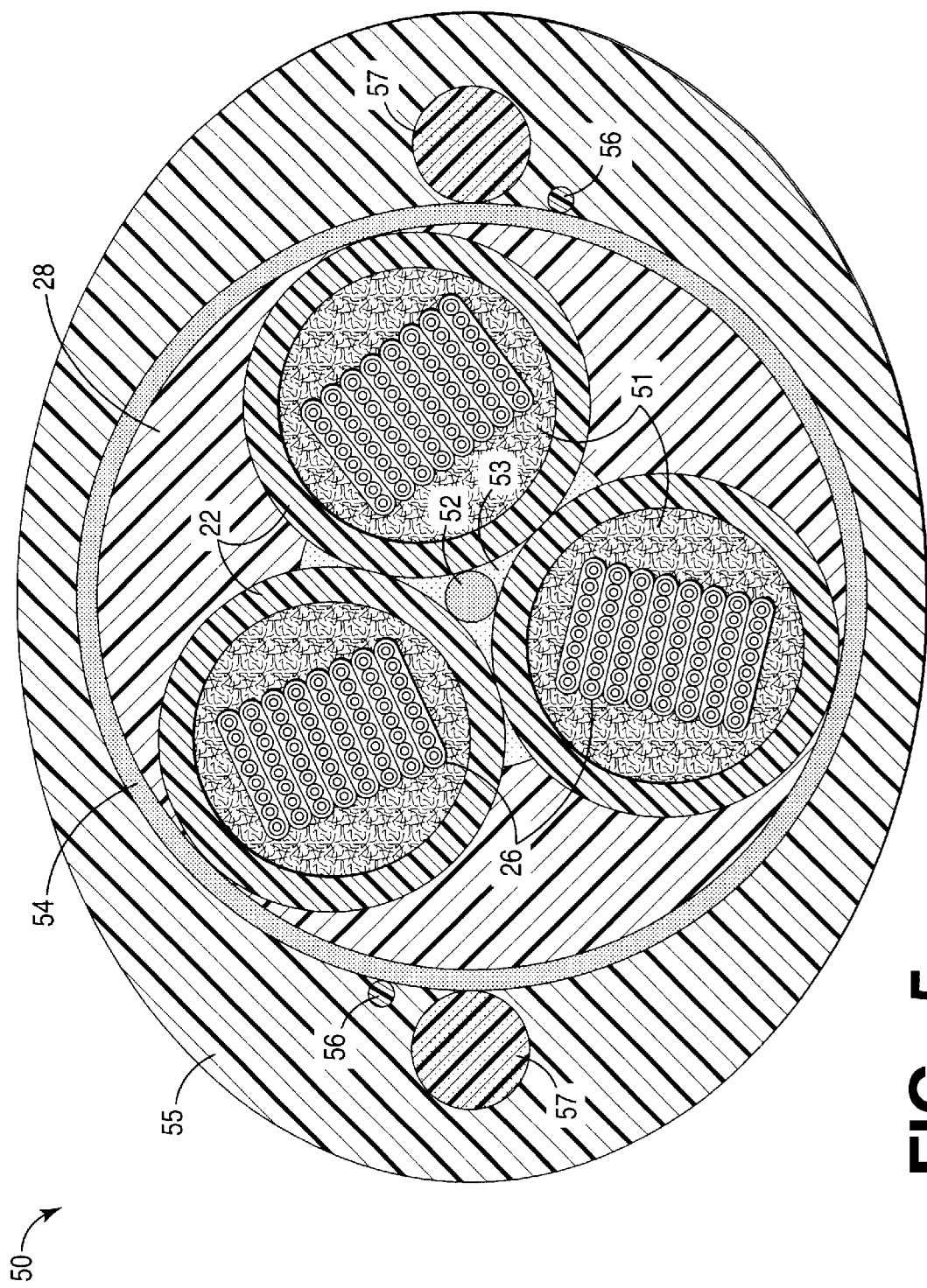
FIG. 5 is a cross-sectional view of a multi-fiber optical cable according to still another embodiment of the invention.

Referring now to FIG. 5, a multi-fiber optical cable 50 according to another alternative embodiment of the invention is shown. The cable 50 is similar to the cable 30 shown in FIG. 3 in that the cable 50 includes one or more fiber ribbons within the multi-fiber unit tubes 22. However, the cable 50 shown in FIG. 5 also includes one or more other features, e.g., features similar to the cable 40 shown in FIG. 4 and described hereinabove. In FIG. 5, the cable 50 is shown including a plurality of multi-fiber unit tubes 22 having a fiber ribbon stack 26 and a filling compound 51 disposed therein. Alternatively, to prevent water penetration, a superabsorbent powder, tape or yarn is substituted for the filling compound 51. A water blocking yarn 52 and a water blocking powder arrangement 53 are shown disposed generally between the multi-fiber unit tubes 22. A dry filling compound 28 according to embodiments of the invention is formed around the multi-fiber unit tubes 22 and the water blocking powder 53.

The cable 50 also includes a water blocking tape layer 54 formed around the dry filling compound 28, a protective sheath 55 formed around the dry filling compound 28 and the water blocking tape layer 54, one or more rip cords 56 disposed within the protective sheath 55 and one or more strength members 57 disposed within the protective sheath 55. The protective sheath 55 is made of, e.g., medium-density polyethylene, high-density polyethylene, linear low-density polyethylene, polyvinylchloride, impact-modified polypropylene, a low-smoke zero-halogen filled polyolefin, or other suitable material. Also, the rip cords 56 are disposed within the protective sheath 55, e.g., near the interface between the protective sheath 55 and the dry filling compound 28, to provide relatively easy access into the protective sheath 55.

Figure 6:
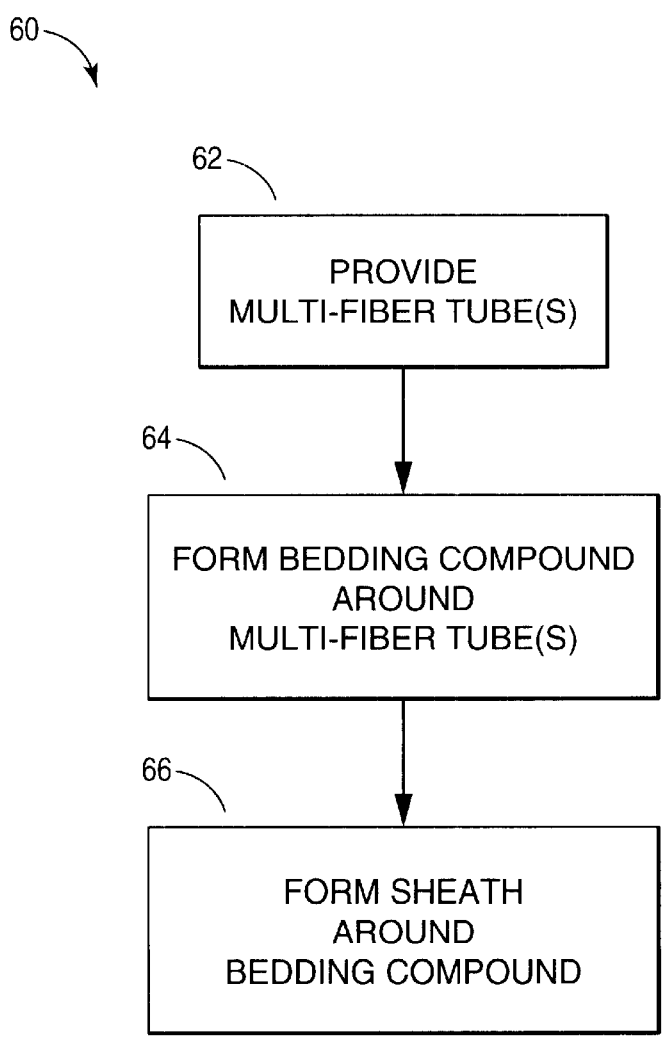
FIG. 6 is a simplified block diagram of a method for making an optical cable according to embodiments of the invention.

Referring now to FIG. 6, a simplified block diagram of a method 60 for making an optical communication cable according to embodiments of the invention is shown. The method 60 includes a first step 62 of providing one or more multi-fiber unit tubes having one or more optical fibers therein. As discussed previously herein, the optical fibers are disposed within, e.g., multi-fiber unit tubes as individual optical fibers or as one or more fiber ribbons.

The next step 64 is to form a dry filling compound in accordance with embodiments of the invention around the multi-fiber unit tubes. The dry filling compound, as discussed hereinabove, is made of a material that is suitably firm to maintain the relative position of the multi-fiber unit tubes within the dry filling compound but also soft enough to allow relatively easy access into the dry filling compound. The dry filling compound, which is made of a soft, non-adhesive plastic or rubber material, is formed around the multi-fiber unit tubes, e.g., by extruding, UV-curing, or reactive foaming.

As discussed hereinabove, embodiments of the invention encase the dry filling compound around multi-fiber units such as multi-fiber tubes and fiber ribbon stacks in such a way as to preserve the relative position of the multi-fiber units and yet to allow for relatively easy access to the multi-fiber units through the dry filling compound. Also, the dry filling compound preserves any stranding or twists in the optical fibers. Also, the dry filling compound enhances crush protection compared to conventional arrangements, functions as a heat barrier and conveniently rounds out the shape of a plurality of multi-fiber units. Moreover, some dry filling compound materials according to embodiments of the invention also are flame-retardant, thus reducing or eliminating the need for additional flame retardant layers.

Furthermore, optical cables according to embodiments of the invention improve both handling and access of the optical cabling, which improvements include the elimination of tools for fiber access. Also, optical cables according to embodiments of the invention reduce the need for filling compounds such as gel.

Alternatively, the method 60 also includes a step 66 of applying or otherwise forming one or more protective sheath or layers around the dry filling compound. As discussed above, the protective sheath is, e.g., one or more tensile strength members and/or a layer of low release electrolytically chrome-coated steel armor, around which is formed a protective jacket made of, e.g., a high-density polyethylene or one or more other suitable materials. The protective sheath is formed around the dry filling compound using, e.g., conventional techniques.

It will be apparent to those skilled in the art that many changes and substitutions can be made to the embodiments of the optical fiber cables, cable systems and methods herein described without departing from the spirit and scope of the invention as defined by the appended claims and their full scope of equivalents.

What is claimed is:

1. An optical cable comprising:
    at least one multi-fiber unit tubular cable member within said cable having therein a plurality of optical fibers and a protective jacket surrounding and enclosing said plurality of optical fibers;
    said cable having a protective outer jacket surrounding said unit tubular member creating voids within said cable;
    said multi-fiber unit having a relative position within said outer jacket;
    said cable having a material therein external to said multi-fiber unit for firmly maintaining said unit in its relative position within said outer jacket, said material comprising a dry filling compound formed about said multi-fiber unit and substantially completely filling the voids within said outer jacket and which has sufficient rigidity to maintain said relative position of said unit tubular member within said outer jacket while protecting said unit tubular member from crushing forces external to said cable.

2. The optical cable as claimed in claim 1 wherein said dry filling compound is formed around said multi-fiber unit tube in such a way that the relative position of said tube is maintained within the optical cable, said dry filling compound being a powderless, soft, non-adhesive material.

3. The optical cable as claimed in claim 2 wherein the dry filling compound is made of a non-powdered material selected from the group consisting of an extrudable rubber, an extrudable plastic, a UV-cured acrylate, a plasticized polyvinylchloride, a soft polyolefin, a butyl rubber, an ethylene-propylene rubber, and a reactively formed foam.

4. The optical cable as claimed in claim 2, wherein the dry filling compound contains flame-retardant fillers.

5. The optical cable as claimed in claim 1, wherein the optical cable further comprises a plurality of multi-fiber unit tubular cable members and said dry filling compound is formed around the plurality of multi-fiber unit tubular cable members in such a way that the position of each of the plurality of multi-fiber unit tubular members, relative to the other multi-fiber tubular members, is maintained.

6. The optical cable as claimed in claim 5 wherein said plurality of multi-fiber unit tubular members is arranged in a stranding pattern, said stranding pattern dictating the position of each of said tubular members relative to the other tubular members in said plurality.

7. The optical cable as claimed in claim 5 and further comprising at least one strength member within said outer jacket.

8. The optical cable as claimed in claim 5 and further comprising one or more water blocking agents of material different from said dry filling compound disposed between at least a portion of the plurality of multi-fiber unit tubes.

9. The optical cable as claimed in claim 1 and further comprising a rip cord formed in said dry filling compound.

10. An optical waveguide system for transmitting optical energy comprising:
    at least one source of optical energy;
    a receiver for receiving optical energy from said source;
    an optical cable coupled between said source and said receiver for transmitting optical energy therebetween;
    said cable having a plurality of multi-fiber unit tubular cable members surrounded by an outer jacket member, said tubular cable members being arranged in a stranding pattern along the length of said cable, wherein each of said tubular cable members has a relative position within said outer jacket member; and
    a dry filling compound formed about said plurality of tubular members and external thereto within said jacket in such a way that the position of each of said tubular members relative to the position of the other tubular members in said plurality is maintained within the stranding pattern at any point along the length of the cable.

11. The optical waveguide system as claimed in claim 10 wherein said dry filling compound is a powderless soft, non-adhesive material.

12. The optical waveguide system as claimed in claim 11 wherein the dry filling compound is a material selected from the group consisting of an extrudable rubber, an extrudable plastic, a soft UV curable acrylate, and a foamed plastic.

13. The optical waveguide system as claimed in claim 10 wherein at least one of said multi-fiber unit tubular members contains at least one optical fiber ribbon having a plurality of optical fiber therein.

14. A method of making an optical fiber communication cable comprising the steps of:
    providing a plurality of multi-fiber unit tubular cable members each having therein a plurality of optical fibers;
    imparting to said tubular members a stranding pattern whereby each of said tubular members is positioned relative to the other tubular members of said plurality in accordance with the stranding pattern;
    forming a dry filling compound around said tubular members externally thereof of sufficient rigidity to maintain the stranding pattern, said dry filling compound being a powderless, soft, non-adhesive material; and
    enclosing said tubular members and said filling compound within an outer protective jacket.

15. The method as claimed in claim 14 wherein the dry filling compound forming step comprises extruding, UV-curing, and forming the dry filling compound around the plurality of multi-fiber unit tubular members externally thereof.

16. The method as claimed in claim 14 wherein the dry filling compound contains flame retardant material.

17. An optical fiber cable comprising:
    a tubular cable member having two or more multi-fiber unit tubular cable members each having a plurality of fibers therein and a protective jacket surrounding and enclosing said plurality of optical fibers;

said cable having a protective outer jacket surrounding said multi-fiber units creating voids within said cable;

each of said multi-fiber units being arranged in a position relative to the other multi-fiber units to create a stranding pattern;

a dry material within said protective outer jacket for maintaining said stranding pattern, said material comprising a dry filling compound formed about said multi-fiber units and substantially completely filling said voids;

said formed dry filling compound having sufficient firmness to protect said multi-fiber units from crushing forces external to the cable.

18. The optical fiber cable as claimed in claim 17 wherein said dry filling compound comprises a soft, non-adhesive plastic material such as a soft UV-cured acrylate.

19. The optical fiber cable as claimed in claim 17 wherein said dry filling compound is a soft polyolefin material.

20. The optical fiber cable as claimed in claim 17 wherein said dry filling compound is a butyl rubber material.

21. The optical fiber cable as claimed in claim 17 wherein said dry filling compound is an ethylene-propylene rubber material.

22. The optical fiber cable as claimed in claim 17 wherein said dry filling compound is a foamed material.

23. The optical fiber cable as claimed in claim 17 wherein said dry filling compound is an extruded material.

* * * * *